J. C. MURPHY.
Farm Gate.
No. 53,856.
Patented April 10, 1866.
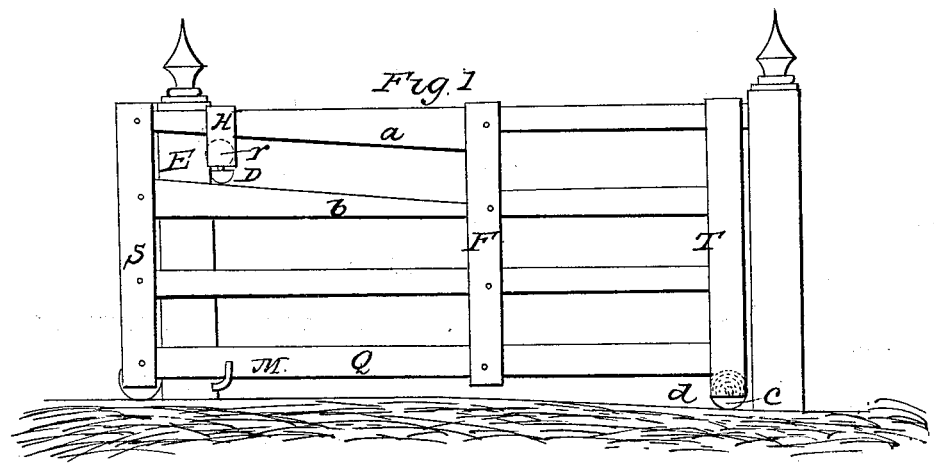
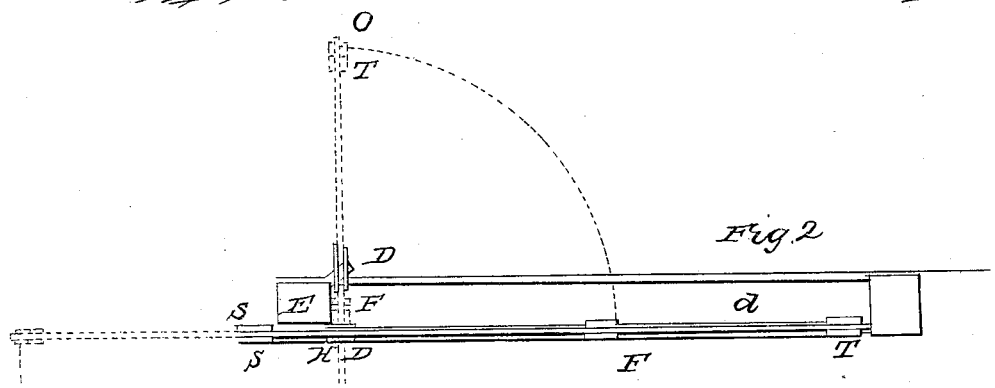
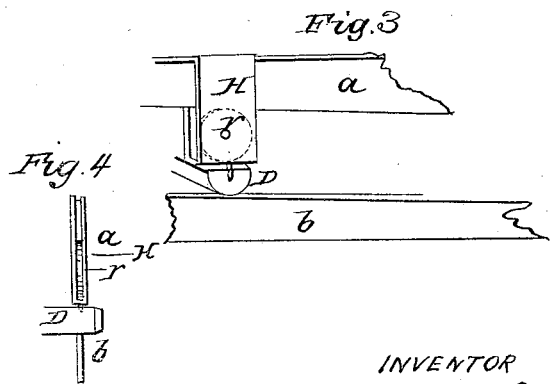
INVENTOR
J. C. Murphy

UNITED STATES PATENT OFFICE.

J. C. MURPHY, OF MENDOTA, ILLINOIS.

IMPROVEMENT IN FARM-GATES.

Specification forming part of Letters Patent No. 53,856, dated April 10, 1866.

*To all whom it may concern:*

Be it known that I, J. C. MURPHY, of the town of Mendota and county of La Salle, in the State of Illinois, have invented a new and useful Improvement in Yard or Farm Gates; and I do hereby declare the following to be a correct description of the same, reference being had to the accompanying drawings, making part of this specification, in which—

Figure 1 represents a front view of the gate. Fig. 2 represents the ground plan. Fig. 3 represents caster-hinge with two upper bars. Fig. 4 represents cross-section of the same.

The nature of my invention consists in so constructing gates for ordinary use that the opening and closing operation shall be an improvement on those in general use.

The form or manner of constructing the gate will not differ materially from those in common use. The top bars, *a b*, Fig. 1, will be beveled, the first, *a*, on the lower, and the second, *b*, on the upper, edge. The lower end of the post at point of opening, opposite side from hinge, will be furnished with a caster or small wheel, *c*, to run either upon a sill, *d*, if for an ordinary yard-gate, or upon a beaten gravel track, the inclination of which (and the sill, if used) will be parallel to the bevel of the arms *a* and *b*, above mentioned.

The hinge H, Figs. 1, 2, 3, 4, of the gate will be a caster-hinge, consisting of a slight casting or wrought-iron of three sides, Fig. 3, with a pivot attached, which moves on a point in block D, which is made of dry hard wood, inserted in either angle of the gate-post E for this purpose, as also, by its touching arm *b*, Fig. 1, I prevent the gate from rising beyond the desired level, when moved sidewise, to effect an opening, or, as will be regulated by the bevel of arm *a*. In this iron frame, which is loosely attached to the arm *a*, is a wheel or caster, *r*, upon which the upper arm, *a*, rests, which, by reducing friction, enables the gate to move back or forward with ease, and when for an ordinary house or yard gate a sill, *d*, is used, which enables the gate to close by its gravity, the caster *c* running on this sill laid parallel with the bevel of the arms *a* and *b*, Figs. 1 and 3. This sill may be used for all gates, but is more particularly intended for yard-gates of dwellings.

Fig. 2 represents the ground plan of the gate —say farm-gate. After being moved to the left, as far as permitted by uprights F, Figs. 1 and 2, it may be turned with ease on the caster-hinge as a pivot in the direction O P, the lower arm, Q, Fig. 1, resting upon the bent iron M, Fig. 1, which, while permitting the lower arm to pass freely over it, also preserves the relative distance between the lower part of the gate and post E, after the upper arm, *a*, has passed over the pulley the desired distance. The gate can be revolved with little exertion on the pivot of the caster-hinge resting on block D. When again restored to its original direction, it will close easily by descending the inclined plane or sill *d*.

What I claim as my improvement, and desire to secure by Letters Patent, is—

A gate constructed substantially as described, in combination with the wheel *c*, track *a*, hook M, pulley H, and inclined bars *a b*, arranged and operating as and for the purpose specified.

J. C. MURPHY.

Witnesses:
 B. A. M. FROISETH,
 JAMES W. BEALL.